US 7,977,262 B2

(12) United States Patent
Motoya et al.

(10) Patent No.: US 7,977,262 B2
(45) Date of Patent: Jul. 12, 2011

(54) GLASS COMPOSITION FOR LAMP, LAMP, BACKLIGHT UNIT AND METHOD FOR PRODUCING GLASS COMPOSITION FOR LAMP

(75) Inventors: Atsushi Motoya, Osaka (JP); Yasurou Niguma, Osaka (JP)

(73) Assignee: Panasonic Corporation, Osaka (JP)

( * ) Notice: Subject to any disclaimer, the term of this patent is extended or adjusted under 35 U.S.C. 154(b) by 833 days.

(21) Appl. No.: 11/816,647

(22) PCT Filed: Mar. 28, 2006

(86) PCT No.: PCT/JP2006/306252
§ 371 (c)(1),
(2), (4) Date: Aug. 20, 2007

(87) PCT Pub. No.: WO2006/106659
PCT Pub. Date: Oct. 12, 2006

(65) Prior Publication Data
US 2009/0201664 A1    Aug. 13, 2009

(30) Foreign Application Priority Data
Apr. 1, 2005   (JP) .................................. 2005-106024

(51) Int. Cl.
  C03C 3/095  (2006.01)
  C03C 3/089  (2006.01)
  C03C 3/091  (2006.01)
  C03C 3/093  (2006.01)
  C03C 3/083  (2006.01)
  C03C 3/085  (2006.01)
  C03C 3/087  (2006.01)
  C03C 3/078  (2006.01)

(52) U.S. Cl. ................ 501/64; 501/65; 501/66; 501/67; 501/68; 501/69; 501/70; 501/72

(58) Field of Classification Search .............. 501/60–62, 501/64–70, 72
See application file for complete search history.

(56) References Cited

U.S. PATENT DOCUMENTS
4,520,115 A * 5/1985 Speit et al. ...................... 501/60
(Continued)

FOREIGN PATENT DOCUMENTS
CN         1227195 A      9/1999
(Continued)

OTHER PUBLICATIONS
Korean Patent Application No. 2007-7021167 Office Action dated Sep. 6, 2010, 4 pages.
(Continued)

Primary Examiner — David M. Brunsman
Assistant Examiner — Kevin M Johnson

(57) ABSTRACT

A glass composition which contains Ce ions as a component substantially comprises, in terms of oxides, $SiO_2$: 55 to 75 wt %, $B_2O_3$: 6 to 25 wt %, $CeO_2$: 0.01 to 5 wt %, SnO: 0.01 to 5 wt %, $Al_2O_3$: 0 to 10 wt %, $Li_2O$: 0 to 10 wt %, $Na_2O$: 0 to 10 wt %, $K_2O$: 0 to 10 wt %, MgO: 0 to 5 wt %, CaO: 0 to 10 wt %, SrO: 0 to 10 wt %, BaO 0 to 10 wt %, $TiO_2$: 0 to 1.0 wt %, $Fe_2O_3$: 0.01 to 0.2 wt %, $Sb_2O_3$: 0 to 5 wt %, $ZrO_2$: 0.01 to 5 wt %. By having such constituents, the glass composition is capable of suppressing transmission of ultraviolet light and solarization, and thus the glass composition hardly suffers from initial coloring or coloring during lamp production.

11 Claims, 4 Drawing Sheets

| (wt%) | COMPARATIVE EXAMPLE | | | | | | | | | IMPLEMENTATION EXAMPLE | | | | | |
|---|---|---|---|---|---|---|---|---|---|---|---|---|---|---|---|
| | No.1 | No.2 | No.3 | No.4 | No.5 | No.6 | No.7 | No.8 | No.9 | No.1 | No.2 | No.3 | No.4 | No.5 | No.6 |
| SiO2 | 69.9 | 69.7 | 66.6 | 67.7 | 67.4 | 67.0 | 61.2 | 67.0 | 69.3 | 69.9 | 70.0 | 69.1 | 67.8 | 65.7 | 67.2 |
| Al2O3 | 5.8 | 5.7 | 5.0 | 5.8 | 5.8 | 5.3 | 4.5 | 3.0 | 5.1 | 5.2 | 5.2 | 5.3 | 5.3 | 4.5 | 1.2 |
| B2O3 | 15.5 | 15.5 | 15.1 | 16.0 | 16.0 | 15.1 | 13.5 | 15.1 | 15.5 | 15.6 | 15.6 | 16.0 | 15.8 | 13.6 | 15.6 |
| Li2O | | | | 0.46 | 0.46 | 0.46 | | | 0.48 | 0.48 | 0.42 | | | | 0.3 |
| Na2O | 6.2 | 6.2 | 5.9 | 1.5 | 1.5 | 1.4 | 5.3 | 5.9 | 1.4 | 1.6 | 1.4 | 6.2 | 6.1 | 4.8 | 1.4 |
| K2O | | | | 5.1 | 5.1 | 4.9 | | | 4.8 | 4.9 | 4.9 | | | 2.0 | 2.5 |
| MgO | | | | 0.6 | 0.6 | 0.6 | | | 0.5 | 0.7 | 0.5 | | 2.0 | | 0.5 |
| CaO | 2.5 | 2.5 | 2.3 | 1.2 | 1.2 | 1.2 | 2.0 | 3.5 | 0.9 | 0.9 | 0.9 | 0.5 | 0.5 | 3.1 | 0.9 |
| SrO | | | | 0.04 | 0.04 | 0.04 | | | 0.04 | 0.03 | 0.03 | | | 0.2 | 0.01 |
| BaO | | | | 1.4 | 1.4 | 1.2 | | | 1.2 | 0.5 | 0.9 | 2.0 | | 1.0 | 0.2 |
| Sb2O3 | 0.1 | 0.1 | 0.1 | 0.1 | 0.1 | 0.1 | | | 0.1 | 0.09 | | 0.1 | | 0.1 | 0.09 |
| ZrO | | | | | | | | | 0.1 | 0.1 | 0.1 | | | 0.1 | 0.1 |
| Fe2O3 | 0.02 | | | 0.01 | | | | | | 0.02 | | | | 0.01 | |
| TiO2 | | | | | | | | | | | | | | | |
| SnO2 | | | 2.3 | | | | | 5.5 | 0.6 | | | | | | |
| SnO | | 0.3 | | | | | 5.9 | | | 0.01 | 0.04 | 0.4 | 1.1 | 2.3 | 5.0 |
| CeO2 | | | 2.7 | 0.06 | 0.4 | 2.7 | 7.6 | | | 0.01 | 0.05 | 0.4 | 1.4 | 2.6 | 5.0 |
| INIT. COL. | × | × | × | × | ○ | ○ | — | — | × | × | × | × | × | × | × |
| D/W.T. | × | × | × | × | × | × | W.T. | D. | × | × | × | × | × | × | × |
| COL.D.L.P. | × | × | ○ | ○ | ○ | ○ | — | — | ○ | × | × | × | × | × | × |
| 254 nm | 22% | 15% | 0% | 0% | 0% | 0% | — | — | 0% | 0% | 0% | 0% | 0% | 0% | 0% |
| 313 nm | 84.4% | 83.1% | 0% | 31% | 0% | 0% | — | — | 35% | 42% | 29% | 0% | 0% | 0% | 0% |
| α 30/380 (×10⁻⁷) | 38.1 | 44.3 | 42 | 44.3 | 43.2 | 43.8 | — | — | 40.1 | 38.5 | 43.5 | 44.6 | 42.1 | 48.2 | 41.5 |

U.S. PATENT DOCUMENTS

| | | |
|---|---|---|
| 5,528,107 A | 6/1996 | Marlor et al. |
| 5,599,753 A | 2/1997 | Watzke et al. |
| 6,528,444 B1 | 3/2003 | Kondoh et al. |
| 7,667,791 B2 | 2/2010 | Shiratori et al. |
| 2005/0118991 A1 | 6/2005 | Koganti et al. |

FOREIGN PATENT DOCUMENTS

| | | |
|---|---|---|
| EP | 1 905 746 | 4/2008 |
| JP | 04-270138 | 9/1992 |
| JP | 08-055607 | 2/1996 |
| JP | 8-67529 | 3/1996 |
| JP | 2002-060240 | 2/2002 |
| JP | 2002-068774 | 3/2002 |
| JP | 2002-293571 | 10/2002 |
| JP | 2004-091308 | 3/2004 |
| JP | 2007-510381 | 4/2007 |
| KR | 2007-0117683 | 12/2007 |
| WO | 2006/103942 | 10/2006 |
| WO | WO 2006/103942 | 10/2006 |

OTHER PUBLICATIONS

European search report for Application No. 06730200.0, dated Apr. 28, 2010, 6 pages.

* cited by examiner

FIG.1

| (wt%) | COMPARATIVE EXAMPLE ||||||||| IMPLEMENTATION EXAMPLE ||||||
|---|---|---|---|---|---|---|---|---|---|---|---|---|---|---|---|
| | No.1 | No.2 | No.3 | No.4 | No.5 | No.6 | No.7 | No.8 | No.9 | No.1 | No.2 | No.3 | No.4 | No.5 | No.6 |
| SiO$_2$ | 69.9 | 69.7 | 66.6 | 67.7 | 67.4 | 67.0 | 61.2 | 67.0 | 69.3 | 69.9 | 70.0 | 69.1 | 67.8 | 65.7 | 67.2 |
| Al$_2$O$_3$ | 5.8 | 5.7 | 5.0 | 5.8 | 5.8 | 5.3 | 4.5 | 3.0 | 5.1 | 5.2 | 5.2 | 5.3 | 5.3 | 4.5 | 1.2 |
| B$_2$O$_3$ | 15.5 | 15.5 | 15.1 | 16.0 | 16.0 | 15.1 | 13.5 | 15.1 | 15.5 | 15.6 | 15.6 | 16.0 | 15.8 | 13.6 | 15.6 |
| Li$_2$O | | | | 0.46 | 0.46 | 0.46 | | | 0.48 | 0.48 | 0.42 | | | | 0.3 |
| Na$_2$O | 6.2 | 6.2 | 5.9 | 1.5 | 1.5 | 1.4 | 5.3 | 5.9 | 1.4 | 1.6 | 1.4 | 6.2 | 6.1 | 4.8 | 1.4 |
| K$_2$O | | | | 5.1 | 5.1 | 4.9 | | | 4.8 | 4.9 | 4.9 | | | 2.0 | 2.5 |
| MgO | | | | 0.6 | 0.6 | 0.6 | | | 0.5 | 0.7 | 0.5 | | 2.0 | | 0.5 |
| CaO | 2.5 | 2.5 | 2.3 | 1.2 | 1.2 | 1.2 | 2.0 | 3.5 | 0.9 | 0.9 | 0.9 | 0.5 | 0.5 | 3.1 | 0.9 |
| SrO | | | | 0.04 | 0.04 | 0.04 | | | 0.04 | 0.03 | 0.03 | | | 0.2 | 0.01 |
| BaO | | | | 1.4 | 1.4 | 1.2 | | | 1.2 | 0.5 | 0.9 | 2.0 | | 1.0 | 0.2 |
| Sb$_2$O$_3$ | 0.1 | 0.1 | 0.1 | 0.1 | 0.1 | 0.1 | | | 0.1 | 0.09 | | 0.1 | | 0.1 | 0.09 |
| ZrO | | | | | | | | | 0.1 | 0.1 | 0.1 | | | 0.1 | 0.1 |
| Fe$_2$O$_3$ | 0.02 | | | 0.01 | | | | | | 0.02 | | | | 0.01 | |
| TiO$_2$ | | | | | | | | 5.5 | 0.6 | | | | | | |
| SnO$_2$ | | | 2.3 | | | | | | | | | | | | |
| SnO | | 0.3 | | | | | 5.9 | | | 0.01 | 0.04 | 0.4 | 1.1 | 2.3 | 5.0 |
| CeO$_2$ | | | 2.7 | 0.06 | 0.4 | 2.7 | 7.6 | | | 0.01 | 0.05 | 0.4 | 1.4 | 2.6 | 5.0 |
| INIT. COL. | × | × | × | × | ○ | ○ | − | − | × | × | × | × | × | × | × |
| D/W.T. | × | × | × | × | × | × | W.T. | D. | × | × | × | × | × | × | × |
| COL.D.L.P. | × | × | ○ | ○ | ○ | ○ | − | − | ○ | × | × | × | × | × | × |
| 254 nm | 22% | 15% | 0% | 0% | 0% | 0% | − | − | 0% | 0% | 0% | 0% | 0% | 0% | 0% |
| 313 nm | 84.4% | 83.1% | 0% | 31% | 0% | 0% | − | − | 35% | 42% | 29% | 0% | 0% | 0% | 0% |
| α$_{30/380}$ (×10$^{-7}$) | 38.1 | 44.3 | 42 | 44.3 | 43.2 | 43.8 | − | − | 40.1 | 38.5 | 43.5 | 44.6 | 42.1 | 48.2 | 41.5 |

FIG.4

|  | COMPARATIVE EXAMPLE | | | IMPLEMENTATION EXAMPLE |
|---|---|---|---|---|
|  | No.1 | No.2 | No.3 | No.4 |
| A(%) | 75 | 75 | 75 | 75 |
| B(%) | 53 | 55 | 65 | 72 |
| A-B(%) | 22 | 20 | 10 | 3 |

GLASS COMPOSITION FOR LAMP, LAMP, BACKLIGHT UNIT AND METHOD FOR PRODUCING GLASS COMPOSITION FOR LAMP

TECHNICAL FIELD

The present invention relates to a glass composition for a lamp, a lamp, a backlight unit and a method for producing the glass composition for a lamp.

BACKGROUND ART

Generally, fluorescent lamps are used as light source for backlights of transmission liquid crystal display elements such as liquid crystal TVs, displays for PCs, liquid crystal displays for cars and the like that require high-quality displays. Fluorescent lamps for backlights basically have the same structure as fluorescent lamps for general lighting. However, the tube diameter of a glass bulb is smaller and the wall thickness of the glass bulb is thinner.

Conventionally, lead glass, which was used for fluorescent lamps for general lighting, was used for fluorescent lamps for backlights. However, as the tube diameter of the glass bulb became smaller and the wall thickness of the glass bulb became thinner, lead glass became unable to maintain the sufficient mechanical strength and heat resistance.

Therefore, in recent years, borosilicate acid glass is used for fluorescent lamps for backlights, instead of lead glass. Here, the borosilicate acid glass is better in mechanical strength and heat resistance than lead glass.

However, borosilicate acid glass is originally used for sealing electron tubes and electron components, and is not effective enough for suppressing the transmission of ultraviolet light, which is necessary for glass for lamps, and solarization (the coloring of glass caused by ultraviolet light). Therefore, as borosilicate acid glass with these enhanced effects, borosilicate acid glass to which $CeO_2$ and the like are added, for example, is disclosed in Patent Documents 1 and 2.

Patent Document 1: Laid-Open Patent Publication No. 2002-60240

Patent Document 2: Laid-Open Patent Publication No. 2002-68774

DISCLOSURE OF THE INVENTION

The Problems to be Solved by the Invention

However, adding $CeO_2$ causes the coloring of the glass immediately after production (hereafter referred to as, "initial coloring"). Also, a heating process during lamp production causes the coloring of the glass (hereafter referred to as, "coloring during lamp production"). These colorings decrease a lamp luminous flux, causing the decrease in production yield.

The present invention aims to provide a glass composition that is capable of suppressing the transmission of ultraviolet light and solarization and hardly suffers from the initial coloring and the coloring during lamp production, and a method for producing the glass composition. Also, the present invention further aims to provide a lamp that is high in lamp luminous flux and production yield.

Means to Solve the Problems

To achieve the above objectives, the glass composition for a lamp pertaining to the present invention which contains Ce ions as a component, the glass composition for a lamp substantially comprises the following that is expressed in terms of oxides: $SiO_2$: 55 to 75 wt %, $B_2O_3$: 6 to 25 wt %, $CeO_2$: 0.01 to 5 wt %, SnO: 0.01 to 5 wt %, $Al_2O_3$: 0 to 10 wt %, $Li_2O$: 0 to 10 wt %, $Na_2O$: 0 to 10 wt %, $K_2O$: 0 to 10 wt %, MgO: 0 to 5 wt %, CaO: 0 to 10 wt %, SrO: 0 to 10 wt %, BaO: 0 to 10 wt %, $TiO_2$: 0 to 1.0 wt %, $Fe_2O_3$: 0.01 to 0.2 wt %, $Sb_2O_3$: 0 to 5 wt %, $ZrO_2$: 0.01 to 5 wt %.

In accordance with an aspect of the glass composition for a lamp pertaining to the present invention, a cation percentage of $Ce^{3+}$ and $Ce^{4+}$ of the Ce ions satisfies the relation of: $(Ce^{3+})/[(Ce^{3+})+(Ce^{4+})]=0.5$ to 1.

In accordance with another aspect pertaining to the present invention, the glass composition for a lamp in the molten state has a deoxidized property.

In accordance with another aspect pertaining to the present invention, the glass composition for a lamp contains, in terms of oxides, 0.4 wt % or more $CeO_2$ and 0.4 wt % or more SnO.

In the glass composition for a lamp in accordance with yet another aspect pertaining to the present invention, the coefficient of thermal expansion ($\alpha_{30/380}$) is in a range of $34 \times 10^{-7}$/K to $43 \times 10^{-7}$/K.

In the glass composition for a lamp in accordance with yet another aspect pertaining to the present invention, the coefficient of thermal expansion ($\alpha_{30/380}$) is in the range of $43 \times 10^{-7}$/K to $55 \times 10^{-7}$/K.

The lamp pertaining to the present invention includes a glass bulb made of the above glass composition.

The backlight units pertaining to the present invention is provided with the above lamp.

In accordance with another aspect pertaining to the present invention, the backlight unit includes a plurality of the above lamps and a diffusion plate made using a polycarbonate resin and is disposed on the light emission side of those lamps.

The method for producing the glass composition for a lamp pertaining to the present invention includes a melting process of melting glass constituents mixed to be substantially as follows expressed in terms of oxides: $SiO_2$: 55 to 75 wt %, $B_2O_3$: 6 to 25 wt %, $CeO_2$: 0.01 to 5 wt %, SnO: 0.01 to 5 wt %, $Al_2O_3$: 0 to 10 wt %, $Li_2O$: 0 to 10 wt %, $Na_2O$: 0 to 10 wt %, $K_2O$: 0 to 10 wt %, MgO: 0 to 5 wt %, CaO: 0 to 10 wt %, SrO: 0 to 10 wt %, BaO: 0 to 10 wt %, $TiO_2$: 0 to 1.0 wt %, $Fe_2O_3$: 0.01 to 0.2 wt %, $Sb_2O_3$: 0 to 5 wt %, $ZrO_2$: 0.01 to 5 wt %, wherein the glass composition in the molten state is deoxidized in the melting process.

EFFECT OF THE INVENTION

Since $CeO_2$ in the range of 0.01 to 5 wt % and SnO in the range of 0.01 to 5 wt %, in terms of the oxides, are added to the glass composition for lamps of the present invention, the transmission of ultraviolet light and solarization can be sufficiently suppressed, and the initial coloring and the coloring during lamp production hardly occur.

That is, adding 0.01 wt % or more $CeO_2$ can suppress the transmission of ultraviolet light and solarization, while adding 0.01 wt % or more SnO can suppress the initial coloring and the coloring during lamp production.

After having conducted various investigations, the present inventors and the like ascertained that the increase in $Ce^{4+}$ as a component accompanying the addition of $CeO_2$ causes the coloring of glass, and found out that adding SnO reduces the amount of the $Ce^{4+}$, hardly causing the coloring of glass.

Also, the coloring caused by $CeO_2$ can be suppressed, provided that SnO as the component of tin is added. Therefore, this effect cannot be achieved by adding Sn or $SnO_2$. When SnO is added, of Ce ions as a component, the amount of $Ce^{3+}$ increases, while the amount of $Ce^{4+}$ decreases. That is, the valence change of $Ce^{3+}$ to $Ce^{4+}$ is suppressed and the valence change of $Ce^{4+}$ to $Ce^{3+}$ is promoted.

The initial coloring and the coloring during lamp production of the glass composition for a lamp pertaining to the present invention can be suppressed more effectively, when the cation percentage of $Ce^{3+}$ and $Ce^{4+}$ satisfies the relation of: $Ce^{3+}/(Ce^{3+}+Ce^{4+})$: 0.5 to 1.

Also, when the glass composition for a lamp pertaining to the present invention in the molten state has a deoxidization property, the initial coloring and the coloring during lamp production can be suppressed more effectively.

The glass composition for a lamp pertaining to the present invention can achieve the following effects when containing in terms of the oxides, 0.4 wt % or more $CeO_2$ and 0.4 wt % or more SnO.

Generally, diffusion plates made using an acrylic resin are used for backlight units for liquid crystal TVs. However, the diffusion plates are easily warped by absorbing moisture, causing the error of measurements as they get larger. Therefore, diffusion plates made using a PC (polycarbonate) resin which warp less are used for backlight units for large liquid crystal display TVs with the size of the displays larger than 17 inch.

The diffusion plates made using the PC resin, however, are discolored and deteriorated by 313 nm ultraviolet light severely, compared to the diffusion plates made using the acrylic resin. A conventional glass for a lamp can block 186 nm and 254 nm ultraviolet light out of ultraviolet light emitted from mercury, but cannot block 313 nm ultraviolet light sufficiently. Therefore, because of 313 nm ultraviolet light transmitted and leaked from lamps, diffusion plates and diffusion sheets made using the PC resin are discolored and deteriorated, deteriorating the luminance of backlight units.

Therefore, the idea of adding $WO_3$ and $TiO_2$, for example, to the glass to suppress the transmission of 313 nm ultraviolet light can be considered. However, since $WO_3$ and $TiO_2$ have a property of increasing the crystalline of the glass, the glass can cause a devitrification (a phenomenon of losing transparency) in melting or in the heating process during lamp production.

On the other hand, when 0.4 wt % or more $CeO_2$ and 0.4 wt % or more SnO, in terms of the oxides, are added to the glass composition pertaining to the present invention, it is possible to suppress the transmission of 313 nm ultraviolet light sufficiently with small discoloration/deterioration of resin components. In addition, the resin components have no devitrification and substantially no coloring.

The glass composition for a lamp pertaining to the present invention achieves the following effects when the coefficient of thermal expansion ($\alpha_{30/380}$) is $34\times10^{-7}$/K to $43\times10^{-7}$/K or $43\times10^{-7}$/k to $55\times10^{-7}$/K.

Generally, lead wire made of tungsten or kovar alloy, which is capable of resisting the heat caused by a discharge, is used for lamps for backlights. Consequently, it is preferable to bring the coefficient of thermal expansion of glass close to the coefficient of thermal expansion of tungsten and kovar alloy, in order to increase the reliability of airtight sealing.

In the case of the coefficient of thermal expansion ($\alpha_{30/380}$) of the glass composition being $34\times10^{-7}$/K to $43\times10^{-7}$/K, the coefficient of thermal expansion of the glass composition is same as the coefficient of thermal expansion of the lead wire made of tungsten. Therefore, owing to the high chemical resistance, the reliability of airtight sealing is high.

When the coefficient of thermal expansion ($\alpha_{30/380}$) of the glass composition is $43\times10^{-7}$/K to $55\times10^{-7}$/K, the coefficient of thermal expansion of the glass composition is same as the coefficient of thermal expansion of the lead wire made of kovar alloy. Therefore, owing to the high chemical resistance, the reliability of airtight sealing is high.

The lamp pertaining to the present invention includes a glass bulb made of the above glass composition. Therefore, the glass of the glass bulb has little coloring so that the lamp luminous flux is high. Also, since the coloring of the glass bulb during lamp production hardly occurs, the production yield is high.

Since the backlight unit pertaining to the present invention is provided with the above lamp with high lamp luminous flux, the luminance is high.

Also, when the lamp including the glass bulb made of the glass composition to which 0.4 wt % or more $CeO_2$ and 0.4 wt % or more SnO are added is provided with the backlight unit pertaining to the present invention, the deterioration and discoloration of a diffusion plate 14 and a diffusion sheet 15 caused by ultraviolet light are effectively suppressed. Consequently, the decrease in the surface luminance caused by the use of backlight units is suppressed markedly, so that a backlight unit 10 has long life.

High-vision technology for liquid crystal display TVs has been evolving in recent years, with the surface luminance of backlight units having been boosted by increasing the number of cold cathode fluorescent lamps, for example, given that high-vision liquid crystal display TVs require smaller opening ratio and higher surface luminance than normal liquid crystal display TVs. Raising the surface luminance of the backlight unit in this way leads to an increase in the amount of 313 nm ultraviolet light, which severely deteriorates and discolors the diffusion and reflection plates, and conversely causes a drop in the surface luminance of the backlight unit. However, such drop in the surface luminance of the backlight unit pertaining to the present invention hardly occurs.

Furthermore, while there have been increasing demands in recent years for longer life liquid crystal display TVs, an example of which is the call for liquid crystal display TVs having an operating time in excess of 60,000 hours. Since the decrease in the surface luminance of the backlight unit pertaining to the present invention hardly occurs, it is possible to extend the life of the liquid crystal display TVs.

Also, when the glass composition constituting the glass bulb has 0.4 wt % or more $CeO_2$ and 0.4 wt % or more SnO, the transmission of 313 nm ultraviolet light generated by mercury can be suppressed sufficiently. Therefore, even if the glass composition is used for backlight units, the discoloration and deterioration of resin components are little and the reliability of the backlights is enhanced.

According to the method for producing the glass composition for a lamp pertaining to the present invention, the glass composition in the molten state is deoxidized in the melting process. Therefore, it is possible to suppress the initial coloring and the coloring during lamp production of the glass composition having the above properties more effectively.

BRIEF DESCRIPTION OF THE DRAWINGS

FIG. 1 shows constituents and characteristics of a glass composition pertaining to the embodiment of the present invention;

FIG. 4 shows the characteristics of the cold cathode fluorescent lamps pertaining to one embodiment of the present invention.

Figure 2:
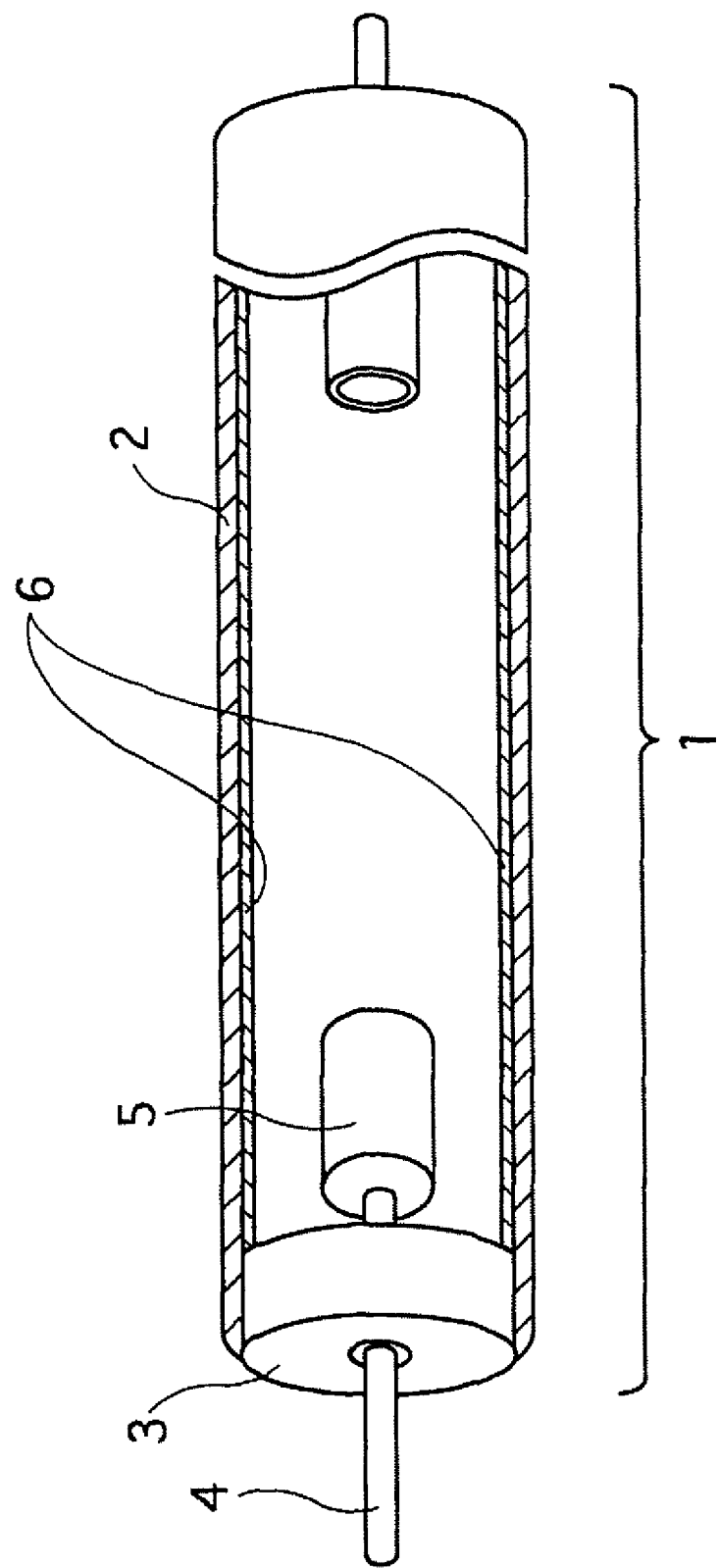
FIG. 2 is a schematic view showing the essential structure of a cold cathode fluorescent lamp pertaining to one embodiment of the present invention.

DESCRIPTION OF NUMERAL REFERENCES 1 fluorescent lamp
2 glass bulb
10 backlight unit
14 diffusion plate

BEST MODE FOR CARRYING OUT THE INVENTION

A glass composition for a lamp, a lamp, a backlight unit and a method for producing the glass composition is described with reference to the accompanying drawings.
<Description of the Glass Composition for Lamps>

The constituents of the glass composition pertaining to the present invention, in terms of oxides, are shown in No. 1 to 6 in FIG. 1

Here, the constituents of the glass composition pertaining to the present invention are not limited to the constituents shown in No. 1 to 6. Yet, in order to maintain the properties as a lamp, it is preferable that the glass composition pertaining to the present invention consists substantially of the following constituents expressed in terms of oxides:

$SiO_2$: 55 to 75 wt %, $B_2O_3$: 6 to 25 wt %, $CeO_2$: 0.01 to 5 wt %, SnO: 0.01 to 5 wt %, $Al_2O_3$: 0 to 10 wt %, $Li_2O$: 0 to 10 wt %, $Na_2O$: 0 to 10 wt %, $K_2O$: 0 to 10 wt %, MgO: 0 to 5 wt %, CaO: 0 to 10 wt %, SrO: 0 to 10 wt %, BaO: 0 to 10 wt %, $TiO_2$: 0 to 1.0 wt %, $Fe_2O_3$: 0.01 to 0.2 wt %, $Sb_2O_3$: 0 to 5 wt %, $ZrO_2$: 0.01 to 5 wt %.

$SiO_2$ is added for the purpose of forming a glass skeleton. When $SiO_2$ is less than 55 wt %, the coefficient of thermal expansion becomes too high, causing the deterioration in chemical resistance. On the other hand, when $SiO_2$ is more than 75 wt %, the coefficient of thermal expansion becomes too low, making the process difficult.

$B_2O_3$ is added for the purpose of improving the glass melting property and adjusting the viscosity. When $B_2O_3$ is less than 10 wt %, the viscosity rises, along with deteriorating the glass melting property, which results in the difficulty in sealing the lead wire. On the other hand, when $B_2O_3$ is more than 25 wt %, the chemical resistance of the glass is deteriorated.

$CeO_2$ is an essential constituent of the glass composition pertaining to the present invention, and is added for the purpose of suppressing the transmission of ultraviolet light. Adding 0.01 wt % or more $CeO_2$ can sufficiently suppress the transmission of 186 nm and 254 nm ultraviolet light. Furthermore, when adding 0.4 wt % or more $CeO_2$, the transmission of 313 nm ultraviolet light can be sufficiently suppressed, too.

When $CeO_2$ is less than 0.01 wt %, the sufficient suppression of the transmission of ultraviolet light cannot be achieved. On the other hand, when $CeO_2$ is more than 5 wt %, the devitrification of the glass occurs, making it impossible to manufacture lamps with desired lamp luminous flux.

Also, the preferred range of $CeO_2$ is in the range of 0.1 to 3 wt %. Within this range, it is possible to obtain the glass having more suitable mechanical strength, heat-resistance, coefficient of thermal expansion and the like for lamps, fulfilling the purpose of adding $CeO_2$.

SnO is an essential component of the glass composition pertaining to the present invention, and is added mainly for the purpose of increasing the amount of $Ce^{3+}$ of Ce ions as a component, and decreasing the amount of $Ce^{4+}$ of Ce ions as a component. In other words, SnO is added for the purpose of suppressing the valence change of $Ce^{3+}$ to $Ce^{4+}$, and promoting the valence change of $Ce^{4+}$ to $Ce^{3+}$.

When 0.01 wt % or more SnO is added, the initial coloring and the coloring during lamp production of the glass can be suppressed sufficiently. To suppress these colorings more effectively, it is preferable to add the mole amount of SnO equal to the mole amount of $CeO_2$ or more. Particularly, it is preferable to add the mole amount of SnO equal to the mole amount of $CeO_2$.

When SnO is less than 0.01 wt %, the effect of increasing the amount of $Ce^{3+}$ and decreasing the amount of $Ce^{4+}$ cannot be achieved. On the other hand, when SnO is more than 5 wt %, the mechanical strength of the glass deteriorates, decreasing the production yield in a tube drawing process.

Also, the preferred range of SnO is in the range of 0.1 to 3 wt %. Within this range, it is possible to obtain the glass having more suitable mechanical strength, heat-resistance, coefficient of thermal expansion for lamps, fulfilling the purpose of adding SnO.

$Al_2O_3$ is added for the purpose of improving the weather-resistance and devitrification. When $Al_2O_3$ is more than 10 wt %, the glass melting property deteriorates. Here, the preferred range of $Al_2O_3$ is in the range of 2 to 7 wt %. Within this range, it is possible to obtain the glass more suitable for lamps.

$Na_2O$, $K_2O$, and $Li_2O$ which are alkaline metal oxides are added for the purpose of decreasing the viscosity of the glass and improving the melting workability of the glass. When the total amount of the $Na_2O$, $K_2O$, and $Li_2O$ is less than 5 wt %, it becomes hard to seal the lead wire made of tungsten and kovar alloy, because of the decrease in the coefficient of thermal expansion and the rise in the viscosity. On the other hand, when the total amount is more than 10 wt %, the coefficient of thermal expansion of the glass becomes too large. Also, alkaline component is easily eluted from the glass and the reactivity of the alkaline component with phosphor and mercury increases, resulting in the deterioration in lamp luminous flux.

Here, the preferred range of $Li_2O$ is in the range of 0 to 5 wt % and that of $Na_2O$ is in the range of 0 to 8 wt %. Within these ranges, it is possible to obtain more suitable glass for lamps.

MgO and CaO which are alkaline earth metal oxides are added for the purpose of improving the electrical insulation and the chemical resistance. When Cao and MgO are less than 0 wt % and less than 0.5 wt % respectively, and MgO and CaO are less than 0 wt % and less than 1 wt % respectively, effects of improving the electrical insulation and chemical resistance cannot be expected. On the other hand, in the case of MgO and CaO being more than 5 wt % and more than 10 wt % respectively, the glass devitrificates easily.

SrO and BaO are added for the purpose of enhancing the glass melting property and the workability of the glass bulb during lamp production. When the amount of SrO and that of BaO are more than 10 wt %, the glass devitrificates easily. Here, the preferable range of SrO is in the range of 0 to 8 wt %. Within this range, it is possible to obtain more suitable glass for lamps.

$TiO_2$ is added for the purpose of suppressing solarization. Since $TiO_2$ increases the crystalline of glass, the content of $TiO_2$ is limited to 1 wt % or less.

$Fe_2O_3$ is added for the purpose of absorbing ultraviolet light. When $Fe_2O_3$ is more than 0.2 wt %, the transmittance of the visible range decreases, and the lamp luminous flux decreases.

$ZrO_2$ is added for the purpose of improving the chemical resistance of the glass. When $ZrO_2$ is less than 0.01 wt %, the effect of sufficient improvement in chemical resistance cannot be achieved. On the other hand, when $ZrO_2$ is more than 5 wt %, the glass become uneven easily and the wall thickness and the measurements of the glass varies.

$Sb_2O_3$ is added for the purpose of suppressing the transmission of ultraviolet light and solarization, and clarifying the glass. The preferable range of $Sb_2O_3$ is within the range of 0.01 to 1 wt %. Within this range, it is possible to obtain more suitable glass for lamps.

Here, the glass composition pertaining to the present invention may include any glass compositions other than those described above as long as the contents of each component are substantially within the above described range and the scope of the above constituents. Examples of other components include ZnO, PbO, $P_2O_5$, $As_2O_3$ and the like.

<Description of the Method for Producing the Glass Composition for Lamps>

The method for producing the glass composition of the present invention is described in the following.

Firstly, types of glass components are mixed within the range of the glass composition pertaining to the present invention. Next, the mixed glass components are thrown into a glass melting furnace, and melted at temperatures of 1500 to 1600° C. for vitrification. Then the melting glass liquid obtained from vitrification is formed into a tube using a tube drawing method such as Danner method and the like, and then cut into a tube having the predetermined size to obtain a glass tube. In addition, the glass tube is heat-processed to manufacture glass bulbs. Then various types of lamps are manufactured.

Since SnO which is added as a glass component serves as a deoxidizer, the glass melting liquid become deoxidized. In the deoxidized glass melting liquid, as the valence change of $Ce^{4+}$ to $Ce^{3+}$ is promoted, the amount of $Ce^{4+}$ decreases and the amount of $Ce^{3+}$ increases.

It is preferable to add 0.01 wt % or more SnO to deoxidize the glass melting liquid. Also, it is preferable to add the amount of SnO necessary for the cation percentage of $Ce^{3+}$ and $Ce^{4+}$ to satisfy the relation of: $Ce^{3+}/(Ce^{3+}+Ce^{4+})$: 0.5 to 1. Furthermore, it is preferable to add the mole amount of SnO equal to the mole amount of $CeO_2$ or more. Particularly, it is preferable to add the mole amount of SnO equal to the mole amount of $CeO_2$.

Here, the method of deoxidizing the glass melting liquid is not limited to the method of adding SnO (deoxidizer) as a glass component. Therefore, deoxidizer other than SnO, for example, may be added. Also, although the amount of SnO, when added, should be within the range of the constituents pertaining to the present invention, a part of Sn component may be $SnO_2$.

In the present invention, the followings are defined as the glass composition in the molten state. One is glass melting liquid which is formed from the glass composition melted in the furnace, and the other is the glass composition in the molten state which has been cooled once to be the glass composition and then has been melted again by heating.

(About Lamps)

A straight tube-shaped cold cathode fluorescent lamp is described as one embodiment of the lamp pertaining to the present invention with reference to the accompanying drawings. FIG. 2 is the schematic view showing the essential structure of a cold cathode fluorescent lamp 1 pertaining to one embodiment of the present invention. The structure of the cold cathode fluorescent lamp 1 basically corresponds to that of a conventional cold cathode fluorescent lamp.

A glass bulb 2 of the cold cathode fluorescent lamp 1 is made of the above glass composition, and its outer diameter, inner diameter and total length are approximately 4.0 mm, approximately 3.4 mm and approximately 730 mm respectively. The glass bulb 2 is manufactured by taking the following steps. Firstly, components that are mixed to be predetermined constituents are thrown to the glass melting furnace and melted at temperatures of 1500 to 1600° C. for vitrification. Then the resultant glass melting liquid is formed into a tube by using the tube drawing method such as Danner method and the like. After that, the tube is cut into the predetermined size and then heat-processed at temperatures of 1500 to 1600° C. to obtain a glass tube. By using the glass tube, it is possible to manufacture various types of lamps in the usual manner.

Here, the outer and inner diameters and the total length of the glass bulb 2 are not limited to the above. However, since the glass bulb 2 for the cold cathode fluorescent lamp 1 is desired to have the small tube diameter and thin wall thickness, the preferable outer diameter of the glass bulb 2 is in the range of 1.8 to 6.0 mm, and the preferable inner diameter of that is in the range of 1.4 to 5.0 mm.

The glass bulb 2 is sealed airtight at each end by a piece of a bead glass 3. In a vicinity of each end of the glass bulb 2, a lead wire 4 made of tungsten or nickel and having an approximately 0.8 mm diameter is sealed airtight, so as to pass through the bead glass 3. Furthermore, a cap-shaped electrode 5 is attached to each lead wire 4 at the end disposed within the glass bulb 2. Here, the electrode 5 is made from nickel or niobium and its surface is coated with electron radioactive material. Note that the pieces of the bead glass 3, the lead wires 4 and the electrode 5 are not limited to the above structure.

Rare earth phosphors 6 formed from a mixture of red, green and blue phosphors ($Y_2O_3$: Eu, $LaPO_4$: Ce, Tb, $BaMg_2Al_{16}O_{27}$: Eu, Mn) are applied to the inner surface of the glass bulb 2. Also, 0.8 to 2.5 mg of mercury (not shown) and rare gas such as xenon and the like (not shown) are enclosed within the glass bulb 2.

Hereinafter, although the cold cathode fluorescent lamp pertaining to the present invention is described specifically with reference to the embodiment, the content of the present invention is not limited to the above embodiment.

(Description of Backlight Unit)

Figure 3:
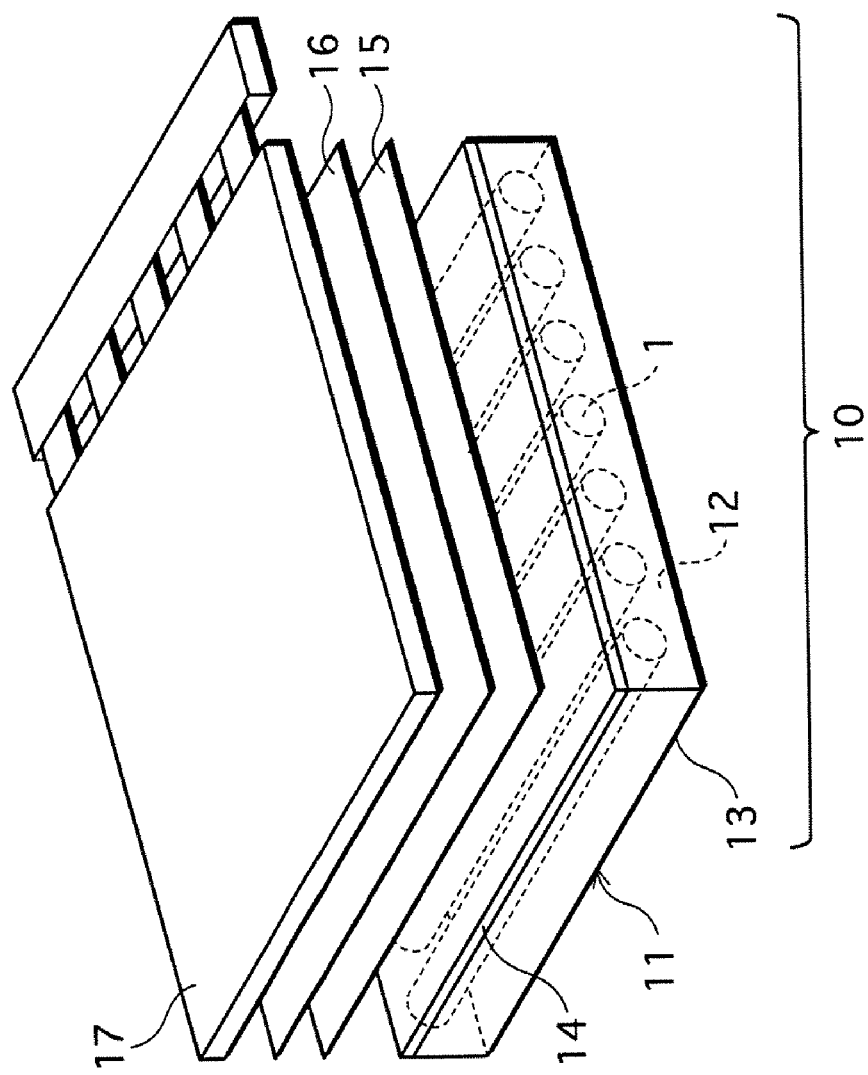
FIG. 3 is a schematic view showing the essential structure of a backlight unit pertaining to one embodiment of the present invention.

FIG. 3 is the schematic view showing the essential structure of a direct-type backlight unit pertaining to one embodiment of the present invention. The structure of a direct-type backlight unit 10 pertaining to the embodiments of the present invention basically corresponds to the structure of backlight units of prior art.

An enclosure 11 made using a white PET (polyethylene terephthalate) resin is formed from a substantially rectangular reflection plate 12 and a plurality of side plates 13 disposed so as to surround the reflection plate 12. A plurality of evenly spaced cold cathode fluorescent lamps 1 are housed in a horizontal lighting direction within the enclosure 11, so as to be close to the reflection plate 12.

The diffusion plate 14 made using PC resin is disposed in the enclosure 11, so as to face the reflection plate 12 with the cold cathode fluorescent lamps 1 interposed therebetween. In the backlight unit 10, the side on which the diffusion plate 14 is disposed relative to the cold cathode fluorescent lamps 1 is the light-emission side of the backlight unit 10, while the side on which the reflection plate 12 is disposed relative to the cold cathode fluorescent lamps 1 is the light-reflecting side of the backlight unit 10. The diffusion sheet 15 made using the PC resin and a lens sheet 16 made using the acrylic resin are disposed on the light-emission side of the diffusion plate 14 so as to overlap one another.

With a liquid crystal display TV that employs the backlight unit 10, a liquid crystal display panel 17 of the TV is disposed on the light-emission side of the lens sheet 16.

Note that the backlight unit 10 is not limited to the above structure. Consider a typical configuration in which the backlight unit 10 is used in a 32-inch liquid crystal display TV, for example. In this case, the measurements of the enclosure 11 are set to a width of approximately 408 mm, a length of approximately 728 mm, and a depth of approximately 19 mm. Also, sixteen cold cathode fluorescent lamps 1 are disposed in the enclosure 11 at equally spaced intervals of approximately 25.7 mm. Also, the total length of the cold cathode fluorescent lamp 1 is about 730 mm and the outer and inner diameters of the glass bulb 2 are set to about 4.0 mm and 3.4 mm respectively. When such backlight unit 10 is operated at a 5.5 mA lamp power, a surface luminance of approximately 8000 cd/m2 is obtained with the lens sheet 16.

(Description of Experiment)

The present invention is described specifically using an implementation example in the following.

The glass of each constituent shown in FIG. 1 was manufactured to evaluate glass characteristics. Here, the described value of $CeO_2$, SnO and $SnO_2$ are the values (wt %) in adding glass components. Each glass was manufactured, taking the following steps. Respective glass components were mixed to have the same constituents as the constituents in the table. Put in a platinum crucible, the mixture was heat-melted in an electric furnace at a temperature of 1500° C. Then the resultant mixture was poured onto the carbon board and cooled.

Here, comparative examples No. 1 to 8 are glass compositions whose contents of $CeO_2$ and SnO are not within the range of the glass compositions pertaining to the present invention. Also, example 9 is the glass composition as borosilicate acid glass for conventional lamps.

Here, as for the coefficient of thermal expansion, cylindrical samples whose diameter and length are 5.0 mm and 15 mm respectively were manufactured. Then the average coefficient of thermal expansion within the temperature range of 30 to 380° C. was measured by a thermo mechanical analyzer (Rigaku Cooperation, TAS300 TMA 8140C).

As for the spectral transmittance, both sides of respective samples were optical-polished to be 2 mm in wall thickness. Then the spectral transmittance within the wavelength range of 200 to 800 nm was measured by a spectrophotometer.

Also, within the visible area range of 380 to 780 nm, any sample whose transmittance is confirmed to be 85 wt % or less is judged as the coloring being "present". The results are shown in FIG. 1. Note that, in FIG. 1, INIT.COL. stands for initial coloring, D/T.W. stands for devitrification/white turbidity, COL.D.L.P stands for coloring during lamp production, 254 nm stands for transmittance at 254 nm, 313 nm stands for transmittance at 313 nm, X stands for absent, ○ stands for present, W.T. stands for white turbidity is present and D. stands for devitrification is present.

As is evident from FIG. 1, the contents of $CeO_2$ and SnO of implementation examples No. 1 to 6 satisfy the constituents of the glass composition pertaining to the present invention. Therefore, the transmittance of 254 nm ultraviolet light is 0% and this means that the effect of suppressing the transmission of ultraviolet light is high. Also, the initial coloring and the coloring during lamp production do not occur.

Above all, since SnO and $CeO_2$ of 0.4 wt % or more are added to implementation examples No. 3 to 6 respectively, the transmittance of 313 nm ultraviolet light is also 0%.

On the other hand, as comparative example No. 1 and 2 do not contain $CeO_2$, the transmission of ultraviolet light is not suppressed much.

Since $SnO_2$, instead of SnO, as the glass component is added to comparative example No. 3, the transmission of 254 nm and 313 nm ultraviolet light are suppressed sufficiently, however, the initial coloring and the coloring during lamp production occur.

Since $CeO_2$ is added, but SnO is not added to comparative example No. 4 to 6, the effect of suppressing the transmission of ultraviolet light is confirmed, but the coloring during lamp production occurs. Also, comparative examples No. 5 and 6 having the relatively high content of $CeO_2$ have the initial coloring.

Even though the equal mole amount of $CeO_2$ and SnO was added to a comparative example 7, the respective amount of $CeO_2$ and that of SnO exceed the predetermined range of the constituents of the glass composition pertaining to the present invention. Therefore, the effect of suppressing the ultraviolet light is confirmed, but the glass is considered not suitable for the glass for lamps since a white turbidity is present.

Since $TiO_2$ as ultraviolet light blocking substance is added to comparative example No. 8, the effect of suppressing ultraviolet light is high. However, comparative example No. 8 is not suitable for glass for lamps due to the devitrification.

In comparative example No. 9, the transmission of ultraviolet light cannot be suppressed and the coloring during lamp production occurs, too.

Next, cold cathode fluorescent lamps whose outer and inner diameters were 3 mm and 2 mm respectively were manufactured using comparative examples No. 1, 2, 9 and an implementation example No. 4. These cold cathode fluorescent lamps were lit for 1000 hours to observer the coloring of glass bulbs caused by solarization, and discoloration and deterioration of resin components caused by the transmission/leaking of ultraviolet light. Then the results were evaluated.

The luminous efficiency of cold cathode fluorescent lamps measured after being operated for 100 hours was set as a standard. Then, the luminous flux maintenance factor A (%) was obtained by comparing the luminous efficiency of cold cathode fluorescent lamps measured after being operated for 1000 hours with the above luminous efficiency. Also, the average surface luminance maintenance factor B (%) of a light guide plate was obtained. Also, the difference between the luminous flux maintenance factor A (%) and the average surface luminance maintenance factor B (%) (A–B) was obtained. The results are shown in FIG. 4.

The value of A–B (%) of the cold cathode fluorescent lamps of comparative example No. 9 was 10%. This is because the conventional cold cathode fluorescent lamp could not suppress the transmission of 313 nm ultraviolet light. This means that resin component such as the light guide plate and the like are discolored and deteriorated after being used for a long time, decreasing the display luminance.

The value of A–B (%) of the cold cathode fluorescent lamp of the implementation example No. 4 was 5% or less. Also, it was found that while the lamp was lit, there was little discoloration/deterioration, which was not practically a problem. Furthermore, there was no coloring of glass caused by solarization.

INDUSTRIAL APPLICABILITY

The glass for a lamp pertaining to the present invention can be used in the wide range of all types of lamps. The glass for lamps pertaining to the present invention is particularly suitable for cold cathode fluorescent lamps and the like for backlight of transmission liquid crystal display elements such as liquid crystal TVs, displays for PCs, liquid crystal displays for cars and the like that require high-quality displays.

The invention claimed is:

1. A glass composition for a lamp which contains Ce ions as a component, the glass composition for a lamp consisting of the following that is expressed in terms of oxides:

$SiO_2$: 55 to 75 wt %,
$B_2O_3$: 6 to 25 wt %,
$CeO_2$: 0.01 to 5 wt %,
SnO: 0.01 to 5 wt %,
$Al_2O_3$: 0 to 10 wt %,
$Li_2O$: 0 to 10 wt %,
$Na_2O$: 0 to 10 wt %,
$K_2O$: 0 to 10 wt %,
MgO: 0 to 5 wt %,
CaO: 0 to 10 wt %,
SrO: 0 to 10 wt %,
BaO: 0 to 10 wt %,
$TiO_2$: 0 to 1.0 wt %,
$Fe_2O_3$: 0.01 to 0.2 wt %,
$Sb_2O_3$: 0 to 5 wt %, and
$ZrO_2$: 0.01 to 5 wt %.

2. The glass composition for a lamp of claim 1, wherein a cation percentage of $Ce^{3+}$ and $Ce^{4+}$ of the Ce ions satisfies the relation of: $(Ce^{3+})/[(Ce^{3+})+(Ce^{4+})]=0.5$ to 1.

3. The glass composition for a lamp of claim 2, wherein the glass composition in the molten state has a deoxidization property.

4. The glass composition for a lamp of claim 3, wherein in terms of oxides, $CeO_2$: 0.4 wt % or more and SnO: 0.4 wt % or more.

5. The glass composition for a lamp of claim 4, wherein the coefficient of thermal expansion($\alpha_{30/380}$) is within the range of $34 \times 10^{-7}$/K to $55 \times 10^{-7}$/K.

6. The glass composition for a lamp of claim 4, wherein the coefficient of thermal expansion($\alpha_{30/380}$) is within the range of $43 \times 10^{-7}$/K to $55 \times 10^{-7}$/K.

7. The glass composition for a lamp of claim 2, wherein in terms of oxides, $CeO_2$: 0.4 wt % or more and SnO: 0.4 wt % or more.

8. The glass composition for a lamp of claim 1, wherein the glass composition in a molten state has a deoxidization property.

9. The glass composition for a lamp of claim 1, wherein in terms of oxides, $CeO_2$: 0.4 wt % or more and SnO : 0.4 wt % or more.

10. The glass composition for a lamp of claim 1, wherein the coefficient of thermal expansion($\alpha_{30/380}$) is within a range of $34 \times 10^{-7}$/K to $55 \times 10^{-7}$/K.

11. The glass composition for a lamp of claim 1, wherein the coefficient of thermal expansion($\alpha_{30/380}$) is within the range of $43 \times 10^{-7}$/K to $55 \times 10^{-7}$/K.

* * * * *